United States Patent [19]

Takada

[11] 4,058,272
[45] * Nov. 15, 1977

[54] INERTIA LOCKED SAFETY BELT TAKE-UP REEL

[75] Inventor: Takezo Takada, Hikone, Japan

[73] Assignee: Takata Kojyo Co., Ltd., Tokyo, Japan

[ * ] Notice: The portion of the term of this patent subsequent to July 29, 1992, has been disclaimed.

[21] Appl. No.: 596,489

[22] Filed: July 16, 1975

Related U.S. Application Data

[63] Continuation of Ser. No. 392,703, Aug. 29, 1973, abandoned.

[30] Foreign Application Priority Data

Sept. 1, 1972  Japan ................................ 47-087123

[51] Int. Cl.² ........................ A62B 35/02; B65H 75/48
[52] U.S. Cl. ............................................. 242/107.4 B
[58] Field of Search ... 242/107.4 R, 107.4 A–107.4 E; 297/388; 280/744–747

[56] References Cited

U.S. PATENT DOCUMENTS

| | | | |
|---|---|---|---|
| 3,446,454 | 5/1969 | Kovacs et al. | 242/107.4 B |
| 3,578,260 | 5/1971 | Kell | 242/107.4 A |
| 3,758,044 | 9/1973 | Nilsson | 242/107.4 A |
| 3,770,225 | 11/1973 | Boblitz | 242/107.4 B |
| 3,819,126 | 6/1974 | Stoffel | 242/107.4 B |
| 3,897,024 | 7/1975 | Takada | 242/107.4 B |
| 3,907,227 | 9/1975 | Takada | 242/107.4 B |

Primary Examiner—Stanley H. Gilreath
Assistant Examiner—John M. Jillions
Attorney, Agent, or Firm—Wolder & Gross

[57] ABSTRACT

An inertia locking safety belt take-up reel comprises a U-shaped bracket and a rotatable reel including side ratchet wheels and journalled between the bracket side walls. A rockable cross piece including pawl projections is supported between the side walls for movement into engagement with the ratchet wheels and is spring biased out of engagement. A clutch wheel is rotatable with the reel and frictionally rotatably supports a cooperating clutch annulus, the two clutch members pivotally engaging a pawl so that their relative rotation attendant to a rapid acceleration of the reel swings the pawl into engagement with a second ratchet wheel to rock the latter, which in turn rocks the cross piece through an interconnecting crank arm, to lock the reel ratchet wheels by the associated pawls. An alarm control gear is driven by a pinion rotatable with the reel.

8 Claims, 10 Drawing Figures

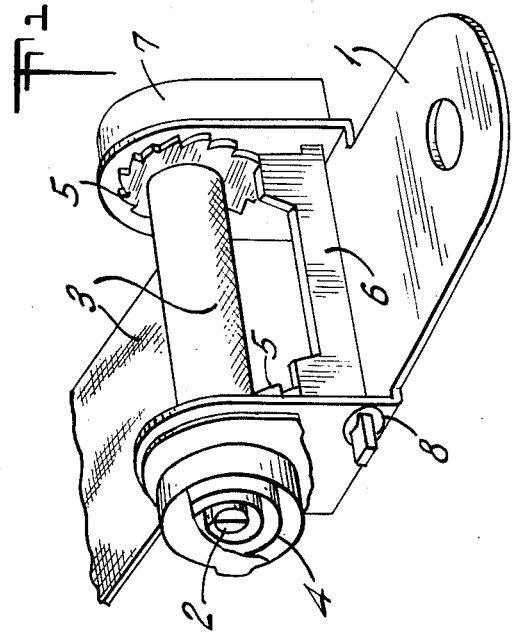
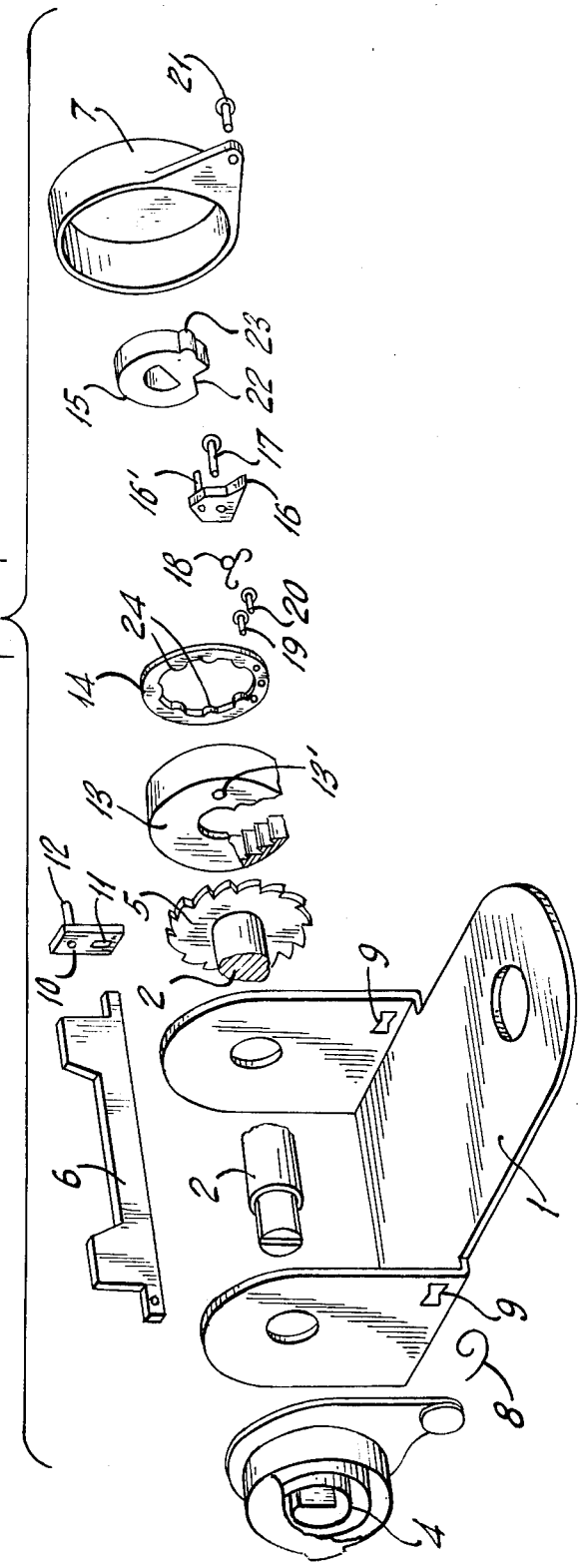

INERTIA LOCKED SAFETY BELT TAKE-UP REEL

This is a continuation of application Ser. No. 392,703, filed Aug. 29, 1973, now abandoned.

BACKGROUND OF THE INVENTION

The present invention relates generally to improvements in vehicle safety devices, and it relates particularly to an improved safety belt take-up reel of the automatic inertia actuated locking type.

There are numerous forms of vehicle safety belt systems in which the seat occupant who is engaged by the safety belt is not restrained, and is thus free to move during normal conditions by reason of the safety belt which is spring retracted, being freely withdrawable, but in which, consequent to an abnormal condition such as a rapid positive or negative acceleration or any action which tends to hurl the occupant out of the seat, the belt is automatically locked against withdrawal to restrain the occupant from leaving the seat. A device which has been proposed for use in such systems is a spring biased belt retraction reel, in which an inertia responsive mechanism actuated by the rapid withdrawal of the safety belt functions to lock the reel against further belt withdrawal. The inertia locking reels of this type heretofore available, however, possess numerous drawbacks and disadvantages. They are expensive and often unreliable devices, an otherwise leave much to be desired. Contributing to such disadvantages, is the need to form the complete device of a strong material such as steel, and to very close tolerances to assure their proper and reliable operation, with the result that these devices are either very expensive or of little reliability, and subject to malfunctioning.

SUMMARY OF THE INVENTION

It is a principal object of the present invention to provide an improved vehicle safety belt device.

Another object of the present invention is to provide an improved safety belt take-up reel.

Still another object of the present invention is to provide an improved inertia actuated belt withdrawal locking safety belt take-up reel.

A further object of the present invention is to provide a device of the above nature characterized by its high reliability, ruggedness, low cost and high versatility and adaptability.

The above and other objects of the present invention will become apparent from a reading of the following description taken in conjunction with the accompanying drawings which illustrate a preferred embodiment thereof.

In a sense, the present invention contemplates the provision of a belt take-up reel mechanism comprising a belt reel, having a first ratchet wheel rotatable therewith, a first pawl moveable into engagement and spring biased out of engagement with the ratchet wheel, a first clutch member rotatable with the reel, a second clutch member coaxial with and in slipping engagement with the first clutch member, a second coaxial rockable ratchet wheel, a second pawl actuated by the relative rotation of the clutch members to engage and rock the second ratchet wheel, and a link connecting the second ratchet wheel to the first pawl to actuate the first pawl to engage the first ratchet wheel with the rocking of the second ratchet wheel.

The improved inertia actuated self locking take-up reel overcomes the numerous drawbacks and disadvantages of the earlier devices. The components which require great strength need little precision, such as the first ratchet wheel and pawl, while those components requiring high precision need little strength, such as the inertia responsive mechanism and can be cheaply produced, such as of resin moldings or die castings, and as a consequence, the improved device can be inexpensively constructed and be of great reliability.

BRIEF DESCRIPTION OF THE DRAWINGS

FIG. 1 is a perspective view, partially broken away, of a preferred embodiment of the present invention;

FIG. 2 is an exploded perspective view thereof;

DESCRIPTION OF THE PREFERRED EMBODIMENTS

Figure 3:
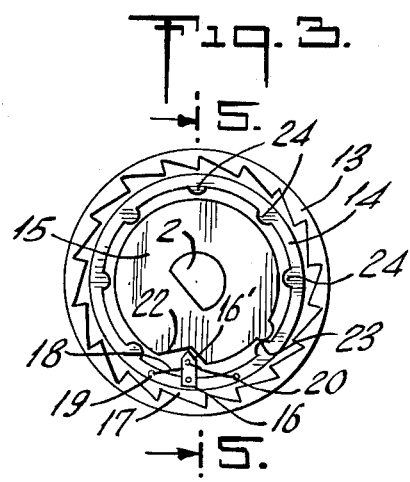
FIG. 3 is an end elevational view of the inertia responsive mechanism thereof, shown in a normal deactuated condition.

Referring now to the drawings, particularly FIGS. 1 to 5 thereof, which illustrate a preferred embodiment of the present invention, the reference numeral 1 generally designates a U-shaped mounting bracket including a base and a pair of side walls or plates having transversely aligned medial journal openings and transversely aligned butterfly openings 9 in their lower inner corners. Journalled in, and projecting beyond the journal openings is a shaft 2, constituting the core of a belt reel, one end of the shaft 2 being engaged by a suitably housed spiral wind-up spring 4, which biases the reel shaft 2 to normally take-up and wind the reel attached safety belt 3 on the reel. Secured to, and rotatable with the shaft 2 and disposed along the confronting inside faces of the bracket side walls, are a pair of similar ratchet wheels 5. A first pawl member 6 includes a rockable cross bar terminating at opposite ends in rectangular end projections, which engage the butterfly openings 9 to be rockable therein, and a pair of pawl defining side projections which are rockable with the cross piece into and out of locking engagement with the ratchet wheels 5. A wire hairpin spring 8, engages one of the pawl member end projections to resiliently bias pawl member 6 out of engagement with ratchet wheels 5.

An inertia responsive mechanism is housed in a cover shell 7 mounted by screws 21 on the outside face of a bracket wall opposite that supporting the spring 4 and functions to control the reel locking pawl member 6. The inertia mechanism is inexpensively precision constructed, such as by die casting or resin injection or transfer molding, and includes a first clutch member 15 affixed to and rotatable with an end of shaft 2. The clutch member 15 is of circular configuration and has a circumferential groove formed in the peripheral face thereof, and is provided with an outwardly directed projection or stop 23 interrupting the circumferential groove and a peripherally spaced notch 22 defined by inwardly converging side faces. An annular shaped inertia or second clutch member 14 is coaxial with and surrounds first clutch member 15, and is provided with peripherally spaced inwardly direction lobes 24, which slideably engage the peripheral groove in clutch member 15, so upon slow acceleration of clutch member 15, clutch member 14 synchronously rotates therewith, but upon a sudden or rapid acceleration of clutch member 15, clutch member 14, by reason of the inertia thereof, lags behind the rotation of clutch member 15 and hence rotates rearwardly relative thereto an amount limited by stop 23.

Rockably, coaxially supported by shaft 2, is a cap shaped second ratchet wheel 13 which includes a circular end wall having an eccentric opening 13' and a circular skirt wall surrounding clutch members 14 and 15 and provided on its inside face with closely spaced ratchet teeth. A longitudinal pivot pin 17 is suitably rigidly mounted on inertia member 14 and rockably supports a claw or second pawl member 16 for swinging movement into and out of engagement with the teeth of ratchet wheel 13, the pawl member 16 having an inner end terminating in converging sides and registering with the notch 22. Also affixed to inertia member 14 on opposite sides of pivot pin 17, are a pair of pins 19 and 20, and a pin or projection 16' is located proximate the inner end of second pawl member 16. A wire spring 18 includes a looped medial portion engaging pin 16' and projecting side arms bearing on pins 19 and 20 to resiliently bias the second pawl 16 to its retracted position out of engagement with ratchet wheel 13 and to resiliently urge inertia member 14 to a retracted counter clockwise position relative to clutch member 15, as viewed in FIG. 3.

A link or crank arm interconnects ratchet wheel 13 and pawl member 6 and includes an arm 10 having at one end a rectangular opening 11, which matingly engages a corresponding end projection of pawl member 6 and having at its other end a pin 12, which rotatably engages the ratchet opening 13' so that rocking of ratchet wheel 13 effects a corresponding rocking of pawl member 6.

Figure 4:
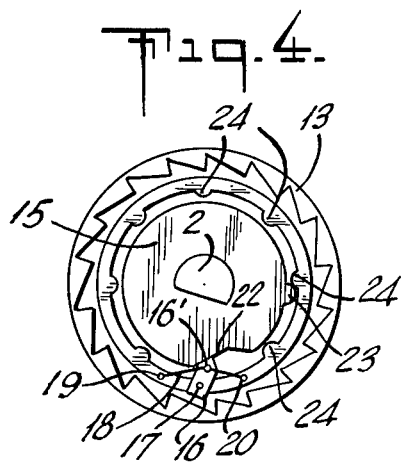
FIG. 4 is a view similar to FIG. 3, the mechanism being shown in an inertia actuated condition.
Figure 5:
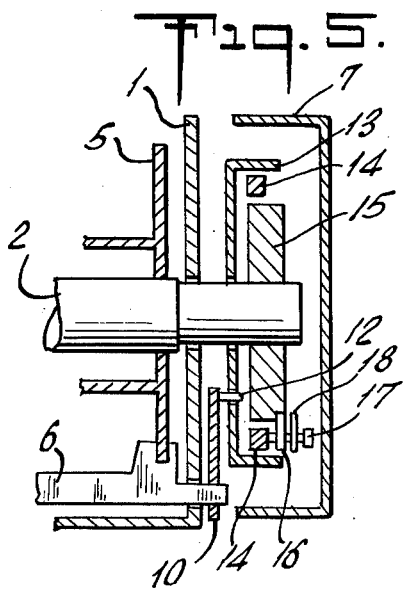
FIG. 5 is a sectional view taken along line 5—5 in FIG. 3.

Considering now the operation of the mechanism described above, there is shown in FIG. 3 the dormant or inoperative condition of the claw or second pawl 16 in normal operation, and FIG. 4 shows how the claw behaves in emergency operation. When the safety belt 3 is being pulled out slowly, such as in normal use or application of the belt, both the inertia wheel 14 and the clutch member 15 rotate at a same speed as shown in FIG. 3, but if the safety belt 3 is pulled out rapidly, such as in consequence of an abnormal situation, rotation of the inertia wheel 14 is slightly delayed behind the clutch plate 15, and as a result the claw 16 is pushed by a side face of the notch 22 into engagement with one of the teeth of the ratchet wheel 13 to impart rotation thereto. This rotation is transmitted through the coupling arm 10 to the pawl member 6, causing the latter to engage the teeth of the ratchets 5 to inhibit further rotation of the shaft 2 and thereby prevent withdrawal of the safety belt 3, so that the safety belt 3 remains fastened to the body of the seat occupant to ensure his safety.

Figure 6:
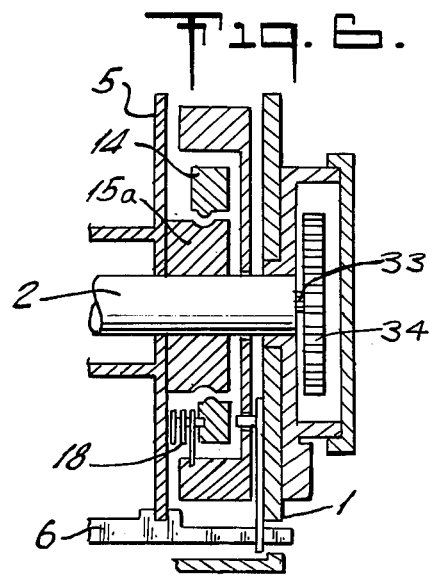
FIG. 6 is a view similar to FIG. 5 of another embodiment of the present invention provided with an alarm actuating mechanism.

For the effective use of the present device, it is essential that the seat occupant wear the safety belt. In order to urge the seat occupant to wear the safety belt without fail, an alarm device designed to sound an alarm when the safety belt is not properly worn may be provided in the mechanism of the present invention. In FIG. 6 is shown, in a sectional view, the structure of the assembly where there is incorporated an alarm actuating device which is electrically operated to issue an alarm unless the safety belt is pulled out to a certain predetermined length. In this case, the precision inertia mechanism is mounted between the frame 1 and the ratchets 5, and a pinion 33 of the alarming device mounted outside of the frame 1 is secured, as by driving fit, to the shaft 2 such that said pinion will cause rotation of an internal gear 34 of the alarm device to actuate a microswitch fitted in a retainer to thereby deenergize and stop an associated electrically energized alarm device. Thus, the operation of the alarm device is effected by utilizing the shaft 2 of the emergency locking device of the present invention. In this case, the clutch plate 15a may be integrally fixed to the ratchet 5, and in all other respects the construction and operation of the embodiment shown in FIG. 6 are generally similar to those of the first described embodiment. With the present mechanism it should be noted, that the enrgy transmitted by the safety belt in the event of an emergency ocurrence is absorbed by the joint operation of the high-rigidity, high strength ratchets and pawl, while the inertia mechanism that must be extremely precise and accurate is distinct and force isolated from the locking mechanism, thus allowing easier obtainment of a precision mechanism and a wider choice of material. Further, an alarm means calling the seat occupant's attention to the wearing of the safety belt can be incorporated in the mechanism. It is thus obvious that the device of the present invention is highly effective in securing safety of the driver or passenger.

While there have been described and illustrated preferred embodiments of the present invention, it is apparent that numerous alterations, omissions and additions may be made without departing from the spirit thereof.

I claim :

1. An automatic locking safety belt reel mechanism comprising a belt take-up reel, a first ratchet wheel rotatable with said take-up reel, a first pawl disposed proximate said first ratchet wheel and actuatable into engagement therewith to lock said reel against belt withdrawal, spring means biasing said first pawl out of engagement with said first ratchet wheel, a first clutch member rotatable with said reel, a second rotatable clutch member coaxial with said first clutch member and in slipping coupling therewith, a second ratchet wheel coaxial with said clutch members, said first ratchet wheel being normally rotatable relative to said second ratchet wheel, a second pawl disposed proximate said second ratchet wheel, means for actuating said second pawl in response to relative rotation between said first and second clutch members to engage and rock said second ratchet wheel, and actuating means responsive to the rocking of said second ratchet wheel to actuate said first pawl into engagement with said first ratchet wheel.

2. The mechanism of claim 1 comprising a mounting bracket including a base plate, and a pair of laterally spaced side plates, said reel extending between said side plates and said first ratchet wheel being disposed between said side plates.

3. The mechanism of claim 2, including a pair of said first ratchet wheels disposed on opposite sides of said reel and between said side plates, a pair of said first pawls, first one of said first pawls registering with each of said first ratchet wheels, a rockable cross-piece extending between said side plates and supporting said first pawls for movement into and out of engagement with said first ratchet wheels, said actuating means including means responsive to the rocking of said second ratchet wheel for rocking said cross-piece.

4. The mechanism of claim 3 wherein said actuating means comprises a crank arm mounted on and rockable with said cross-piece and an eccentric pin mounted on said crank arm and engaging said second ratchet wheel.

5. The mechanism of claim 1 including spring means biasing said second pawl out of engagement with said second ratchet wheel.

6. An automatic locking safety belt mechanism comprising a rotatable reel upon which said belt is windable, a first ratchet wheel rotatable with said reel, a first pawl movable into and out of engagement with said ratchet wheel, spring means biasing said first pawl out of engagement with said first ratchet wheel, a drive member rotatable with said reel, an inertia member rotatable relative to said drive member, means frictionally slip coupling said inertia member to said drive member whereby said inertia member is normally urged to follow said drive member and lag said drive member upon rapid acceleration of said drive member, a rockable actuator second ratchet wheel coaxial with said reel, a second pawl member, means for swinging said second pawl member in response to relative rotation between said drive member and inertia member for engaging and rocking said actuator second ratchet wheel in a forward direction, and means responsive to the forward rocking of said actuator wheel for advancing said first pawl into engagement with said first ratchet wheel.

7. An automatic locking safety belt reel mechanism comprising a belt take-up reel, a first ratchet wheel rotatable with said take-up reel, a first pawl disposed proximate said first ratchet wheel and actuatable into engagement therewith to lock said reel against belt withdrawal, a first clutch member rotatable with said reel, a second rotatable clutch member coaxial with said first clutch member and in slipping engagement therewith, a second ratchet wheel coaxial with said reel clutch members, said first ratchet wheel being normally rotatable relative to said second ratchet wheel, a second pawl disposed proximate said second ratchet wheel, means for actuating said second pawl in response to relative rotation between said first and second clutch members to engage and rock said second ratchet wheel, and actuating means responsive to the rocking of said second ratchet wheel to actuate said pawl into engagement with said first ratchet wheel, one of said clutch members comprising an inner member having a cylindrical peripheral surface and the other of said clutch members comprising an annulus surrounding and slideably engaging said cylindrical surface.

8. The mechanism of claim 7 wherein said inner member has a peripheral groove formed therein and said annulus has inwardly directed lobes slideably engaging said groove.

* * * * *